United States Patent [19]

Akin et al.

[11] 3,939,284

[45] Feb. 17, 1976

[54] PROCESS FOR THE PRODUCTION OF MEAT, POULTRY AND FISH ANALOGS AND THE PRODUCTS THEREOF

[75] Inventors: Cavit Akin, Naperville; Robert J. Flannery, Olympia Fields, both of Ill.; Franklin D. Darrington, Highland, Ind.

[73] Assignee: Standard Oil Company, Chicago, Ill.

[22] Filed: Jan. 29, 1975

[21] Appl. No.: 545,031

[52] U.S. Cl. ............... 426/250; 426/311; 426/622; 426/629; 426/632; 426/634; 426/641; 426/646; 426/648; 426/649; 426/650; 426/656; 426/657; 426/802

[51] Int. Cl.² .. A23J 3/00; A23L 1/30; A23L 1/275; A23L 1/28

[58] Field of Search ........... 426/104, 204, 250, 311, 426/364, 802, 622, 629, 632, 634, 641, 648, 649, 650, 656, 657, 646

[56] References Cited

UNITED STATES PATENTS

| | | | |
|---|---|---|---|
| 3,751,260 | 8/1973 | Akin ............................. | 426/204 X |
| 3,843,807 | 10/1974 | Ridgway, Jr. .................. | 426/204 X |
| 3,845,222 | 10/1974 | Tannenbaum ................. | 426/204 X |

*Primary Examiner*—James R. Hoffman
*Attorney, Agent, or Firm*—Werten F. W. Bellamy; Arthur G. Gilkes; William T. McClain

[57] ABSTRACT

Single-cell protein is combined with plant protein and/or animal protein and texturized to produce analogs which can be used as extenders or replacers for meat, poultry and fish in food products.

25 Claims, No Drawings

PROCESS FOR THE PRODUCTION OF MEAT, POULTRY AND FISH ANALOGS AND THE PRODUCTS THEREOF

BACKGROUND OF THE INVENTION

This invention relates generally to proteinaceous materials containing single-cell proteins, and more specifically, to a texturization process for mixtures of single-cell proteins combined with plant and/or animal proteins which includes mixing, moisturizing, heat-extruding, chopping, drying and cooling to induce texture formation.

In recent years much attention has been directed toward the development of new sources of protein which can be incorporated in foods or food additives suitable for human consumption. Rapid increases in world population have made the continued dependence on traditional sources of protein highly impractical. Moreover, the supply of protein from typical sources of protein, such as animal meat and certain vegetables, is inadequate to provide balanced diets sufficient to satisfy the needs of humans throughout the world.

One possible solution to the problem of supplying the ever-increasing need for food protein is provided by processes for the bio-synthetic manufacture of protein through the growth of microorganisms on hydrocarbons or other substrates. It is known, for example, that microorganisms such as bacteria, fungi, and yeast, which are grown by single-cell reproduction, contain high proportions of proteins and can be utilized directly in foods as a whole cell material or can be treated to recover protein concentrate and protein isolate. Recent efforts have shown that microorganisms, grown on hydrocarbon substrates, can be successfully used in animal feeds; but as yet these microorganisms have not been commercially accepted in food preparations suitable for human consumption.

With the development of successful processes for the fermentation production of protein-containing microorganisms (sometimes referred to herein as single cell proteins), an urgent need has developed for methods of texturizing such single-cell protein materials in a manner sufficient to render them suitable alone or in combination with plant and/or animal proteins for use in food products.

Generally, single-cell protein is initially produced as a slurry and then is subsequently converted into dry powder form. This dry powder, similar in appearance and feel to flour, lacks the texture and food-like sensation to the mouth necessary to make an attractive food. Moreover, when placed in water, the agglomerated particles of single-cell protein rapidly revert back to single-cell form.

As a result of worldwide meat shortages and increased cost and low production efficiency of cattle, fowl and fish, the interest in and production of meat, poultry and fish analogs by using vegetable (plant) protein materials have increased during the recent years. Currently, the most successful process from a texture and flavor point of view is the spinning process for the isolated protein (particularly isolated soy proteins). The spun protein meat analogs have uniform "rod-like" fibrous texture, but when chewed the fibers disperse like "cotton" in the mouth rather than exhibiting a "biting" texture typical of meat. The textured soy flour or soy concentrate products, obtained by extrusion or other processes, do not have any desirable meat appearance or bite. Furthermore, they have a beany taste and aftertaste. We discovered that incorporation of yeast into the soy flour and soy concentrate helps create a meatlike appearance without the need for spinning. The yeast-containing product has also a meatlike chewability. Although yeast partially masks the soybean taste, a sweet-toasted taste exists in all products that are based on soy flour, soy concentrate and yeast mixtures. Such flavors may interfere with the delicate meat, poultry, and fish flavors expected from the meat analogs. We have discovered that such non-meatlike flavors can be removed by washing with water, acidified water or alkaline water at various temperatures. The washed products had improved meatlike textures and they could be flavored to resemble meat, poultry and fish tastes. As we were studying the extrusion texturization of our protein mixtures, we observed that the extrudate retains its thermoplastic properties for a short period immediately after it leaves the die and it can be further shaped. We were surprised to see that the extrudate expanded like rubber when pulled immediately after it left the die. Moreover, as the extrudate lost its thermoplastic character by cooling during pulling, the fibrous meatlike texture was improved and it had the textured mouth feel of meat when hydrated and chewed. The same textured character develops if the extrudate after it leaves the die, or the "set" dry extrudate, is wetted with water and then a friction force is applied such as rolling between fingers.

The living world is divided into three "kingdoms"— plant, animal and protist. The first two are multicellular and their development always involves extensive tissue differentiation. Protists are generally unicellular and lack tissue differentiation. Typical protists include yeasts, fungi and bacteria. Stated differently, protists represent the simplest level of biological organization while even the lower plants and animals represent vastly more complex biological organizations.

Unicellular protists such as yeasts, fungi and bacteria are extremely minute and contain desirable protein enclosed within a cell-wall structure comprising essentially carbohydrate materials. The amino acids comprising the protein of unicellular protists are substantially those involved in the larger protein-containing aggregates of plant or animal origin.

The cell-wall structure may be viewed as a tough, large, bag fashioned from highly cross-linked polysaccharides. Consequently the protein moiety of each cell is shielded from that of every other cell. Hence, the intermolecular bonding forces which are thought to readily effect texturization of protein found within multi-cellular plant or animal structures cannot be utilized unless some means be found for freeing some portion of protein from within the cell structure. This distinctive structure of unicellular protists has heretofore severely limited the utility of yeasts, fungi and bacteria in food products because of inability to effect a suitable and stable degree of texturization.

SUMMARY OF THE INVENTION

According to this invention, there is provided a process for treating mixtures of single-cell protein material combined with plant protein materials and/or animal protein materials in a manner sufficient to impart desirable textural properties thereto. More specifically, single-cell protein material combined with plant protein, such as soy flour, defatted soy flour, soy flakes, soy protein isolates and concentrates, cotton seed flour, cotton seed protein isolates and concentrates, peanut flour, peanut protein isolates and concentrates, sesame seed flour, sesame seed protein isolates and concentrates, corn flour, corn grits, corn protein isolates and concentrates, gluten, cereal protein isolates and concentrates, rapeseed flour and rapeseed protein isolates and concentrates, and/or animal protein such as fish protein concentrate, slaughterhouse waste meat, or bone meal together with other ingredients, such as amino acids, vitamins, minerals, salt, pepper and good coloring agents and the like, if desired, is passed through a pre-conditioning zone wherein the moisture level is raised to about 20 to about 45 per cent. The moisturized protein mixture is extruded at temperatures within the range of 212° to 385°F. to provide a shaped extrudate. The shaped extrudate may be pulled immediately, exposed to a friction force by passing it through differential speed rollers or cooled, rehydrated and exposed to a friction force by passing it through differential speed rollers, prior to drying the extrudate at temperatures ranging from about 130° to 350°F. When the extrudate is cooled, the resulting product has meatlike chewability and resists dispersion in water. This extruded product may be washed with water having a temperature between 5° to about 250°C. and pH of about 4.5 to about 9.5, subjected to a mild shear force by the action of a pair of differential speed rollers and either frozen, canned and retorted while wet or dried at temperatures between 40° to about 230°C. to produce a product having a meatlike appearance, sensory-textural properties of animal proteins and a bland flavor.

By practicing the process of this invention, therefore, one can prepare a single-cell protein containing product having the requisite physical properties of meat, poultry or fish analogs having meatlike appearance, sensory-textural properties of animal proteins and a bland flavor. This textured bland product can be flavored with meat flavorings selected from the group consisting of beef, pork, chicken and fish.

DESCRIPTION OF THE PREFERRED EMBODIMENTS

The process of this invention is especially designed to provide a method for imparting texture characteristics and properties to mixtures of plant and/or animal proteins and protein-containing unicellular microorganisms which were grown by known commercial fermentation processes. In one embodiment of this invention, the cell harvest from a commercial fermentor, as for example the crude, moisture-containing product cake recovered from a centrifuge or filter, serves as a starting meterial for the texturization process.

Any microbial cell materials can be combined with plant and/or animal proteins and treated according to the texturization process of this invention. In a fully integrated, continuous system, the microbial cells are conveniently grown in a first fermenting stage where oxygen and a suitable substrate, such as liquid or gaseous hydrocarbons or oxygenated hydrocarbons such as carbohydrates or alcohols, together with a nutrient solution containing vitamins and minerals are fed to a stirred reactor containing the microorganisms. The growth rate of microorganisms on the hydrocarbon or other substrate is typically exponential in nature. As the microorganism concentration increases, a portion of the reacting mixture is withdrawn from the stirred reactor and the microorganisms are separated from the withdrawn reaction mixture.

By way of illustration, bacteria such as those listed in Table I and yeasts such as those listed in Table II and fungi such as those listed in Table III are suitable microorganisms for use as starting materials in the practice of this invention.

Table I

| Suitable Bacteria |
|---|
| *Acetobacter sp.* |
| *Arthrobacter sp.* |
| *Bacillus subtilis* |
| *Corynebacterium sp.* |
| *Micrococcus sp.* |
| *Pseudomonas sp.* |

TABLE II

| Suitable Yeasts |
|---|
| *Candida curvata* |
| *Candida lipolytica* |
| *Candida pulcherima* |
| *Candida utilis* |
| *Hansenula anomala* |
| *Oidium lactis* |
| *Saccharomyces carlsbergensis* |
| *Saccharomyces cerevisiae* |
| *Saccharomyces fragilis* |
| *Trichlosporon cutaneum* |

TABLE III

| Suitable Fungi |
|---|
| *Aspergillus niger* |
| *Aspergillus glaucus* |
| *Aspergillus* |
| *Aspergillus* |
| *Aspergillus terreus* |
| *Aspergillus itaconicus* |
| *Penicillium notatum* |
| *Pencillium chrysogenum* |
| *Penicillium glaucum* |
| *Penicillium griseofulvum* |

The use of *Candida utilis, Saccharomyces cerevisiae, Saccharomyces fragilis,* or *Saccharomyces carlsbergensis* is the preferred single cell starting component material for the texturization process of this invention, because each is considered by the U.S. Food and Drug Administration to be suitable for use in food products.

The other starting component of the mixture may be selected from the group consisting of plant protein such as soy flour, defatted soy flour, soy flakes, soy protein isolates and concentrates, cotton seed flour, cotton seed protein isolates and concentrates, peanut flour, peanut protein isolates and concentrates, sesame seed flour, sesame seed protein isolates and concentrates, corn flour, corn grits, corn protein isolates and concentrates, gluten, cereal protein isolates and concentrates, rapeseed flour and rapeseed protein isolates and concentrates, and/or animal protein such as fish protein concentrate, slaughterhouse waste meat, or bone meal.

In general, the texturization process comprises mixing, moisturizing, heat-extruding, chopping, drying and cooling an aqueous paste of single-cell protein combined with plant and/or animal proteins from the group listed above. The aqueous paste of single-cell containing protein preferably contains about 20 to 35 percent water, although a water content of 10 to 50 weight percent is suitable. When the single-cell component of the mixture to be texturized comes directly from a fermentation harvesting step, it is often desirable to adjust the water content by means such as centrifuging, drying and then stirring with water addition.

In addition to water, single-cell protein material, plant protein and/or animal protein, the mixture can also contain other ingredients, such as amino acids, vitamins, minerals, salt, pepper and food coloring agents, and the like which enhance the properties of the final product.

In general any of the typical extrusion cooking-texturization processes can be used for the initial texture formation. In such an operation (See schematic diagram) single-cell protein, plant protein materials and/or animal protein materials along with other ingredients are mixed together (No. 1), preconditioned (No. 2) and extrusion cooked (No. 3). The single-cell protein content of the mixture ranges from 5% to 60%, with the preferred range being between 15% to 35%. The plant protein materials and/or animal protein materials are selected from those listed above. Other ingredients are products such as fish protein concentrate, oil soluble flavorings, Food, Drug and Cosmetic Act lake colorings, etc. The preferred plant protein source is soybean. Defatted soybean flour content ranges between 40% to 95%, with preferred range of 65 to 85%. Protein concentrates and isolates are also included in the mixture optionally at 1% to 95% range. The preferred range for the protein isolates and concentrates is 5 to 20%. At the preconditioning stage water or steam is added to bring the moisture content of the mixture to 35%. The extrusion cooking temperatures range between 180° to 385°F., with a preferred range of 210°-275°F. The extruded product is normally chopped to small sizes with a rotary knife (4). It is preferred for the purposes of this invention that the particle sizes be large ranging from about 1/16 inch to 4 inches diameter, to 1/64 inch to 10 inches length. Preferred size ranges are 1/8 to 2 inches diameter and 1/2 to 5 inches length. The chopped particles would normally be dried (No. 5) and cooled (No. 6). The dry particles are washed in a counter current washer (No. 7) by using hot or cold water, or hot or cold acidified or alkaline water. The washed product is subjected to mild shear by the action of a pair of differential speed rollers and then dried (No. 9) or frozen (No. 10). In a preferred procedure the particles are washed without going through the initial drying and cooling steps. In an alternative procedure, the extruded product is washed with water, acidified water, or alkaline water, under pressure in a batch or continuous retort (No. 11). Washed product is again passed between the differential speed rollers (No. 12) and dried (No. 13); as an alternative, the washed and sheared particles are canned (No. 16) and retorted (No. 15) while wet. In these various operations water, acidified water, or alkaline water temperatures range between 5°C. to 250°C., with preferred range for cold water of 10°–30°C., and for the hot water, 65°–100°C., and for the retort washed samples 110°–150°C. Dryer temperatures range between 40°C. to 230°C. with a preferred range of 65°–105°C. The products so obtained have the appearance of meat poultry or fish and they have the sensory-textural properties of these animal proteins, with a bland flavor and resists dispersion in water. Now flavorings are added to these textured products to have them taste like meat, poultry, or fish.

The following schematic diagram serves to illustrate the steps involved in the practice of this invention.

PROCESS FOR THE PRODUCTION OF MEAT, POULTRY AND FISH ANALOGS

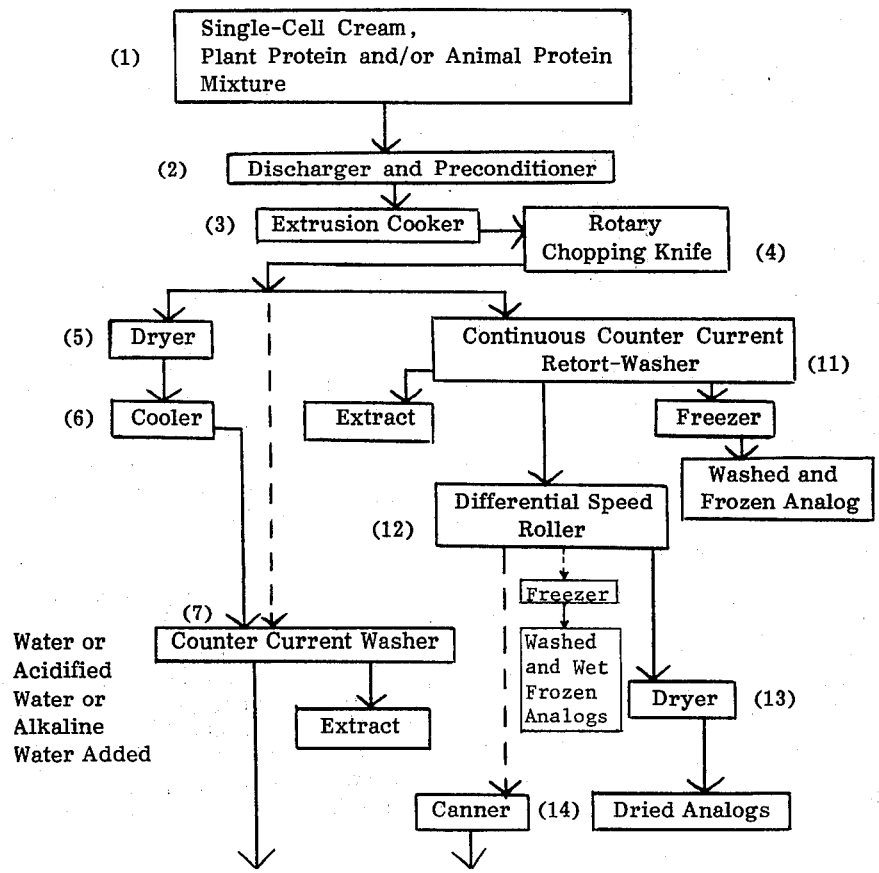

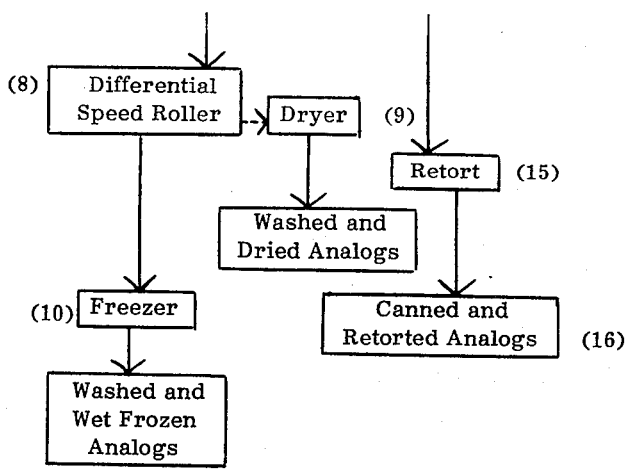

EXAMPLES

The following examples are illustrative, without implied limitation, of our invention.

EXAMPLE I

A mixture of 30% P-10 (Amoco Torula Dired Yeast), 60% defatted non-toasted soy flour (Soyafluff 200W of Central Soya) and 10% soy protein isolate (Supro-610 of Ralston Purina) was extruded through a Wenger X-5 extruder with a 265°F. fifth head temperature. 1st and 2nd heads were water cooled while the 3rd, 4th and the 5th heads were steam heated. The extruded product was light brown in color and mild in taste with slightly masked soybean taste. It could be easily hydrated without dispersion in water and when wetted it did not become mushy. The hydrated product had a meatlike chewability. After oven drying, the textured product was slower to hydrate but retained its desirable chewability characteristics. When the oven dried product was hydrated and retorted 15 minutes at 250°F. under 15 psi steam pressure, it retained its textural and chewable quality while the commercially available textured vegetable protein products, which were based on soyflour only, or soyflour and soy concentrate developed a mushy texture.

EXAMPLE II

A mixture of 30% P-10 (Amoco Torula) and 70% defatted non-toasted soy flour (Soyafluff 200W of Central Soya) was extruded through a Wenger X-5 extruder. The fifth head temperature was maintained at 270°F., 1st, 2nd and 3rd heads were water cooled and the 4th and 5th heads were steam heated. The extrudate was light brown in color with slightly puffed texture. The extrudate was chewable when wetted and retained a chewable texture after retorting under similar conditions given in Example I.

EXAMPLE III

The test in Example I was repeated except that a mixture of 30% P-10, 65% soyflour (Soyafluff 200W) and 5% meat and bone meal was used, and the fifth head temperature was maintained at 225°–250°F. The extruded product was very light brown-cream in color. After hydration and autoclaving its texture and chewability were similar to that of the product of Example I.

EXAMPLE IV

A mixture of 30% P-10 (Amoco Torula), 35% defatted soy flour (Soyafluff 200W), 5% meat and bone meal and 30% wheat flour was extruded with a Wenger X-5 extruder, with the fifth head temperature at 225°–250°F. A puffed product was obtained with light brown-cream color. It was puffed but its texture did not hold in water.

EXAMPLE V

A mixture of 30% P-10 (Amoco Torula Dried Yeast) and 70% defatted soyflour was extruded through a Wenger X-5 extruder, the extruded, rod-shaped product was pulled by hand and stretched. When it was cooled and set it had meatlike fibrous texture and meatlike textural mouth feel when chewed.

EXAMPLE VI

The same extrudate as in Example V was pressed and rolled with fingers, or between thumb and palm of hand to apply a friction, meatlike fibrous texture was developed.

EXAMPLE VII

The same extrudate as in Example V was allowed to set; then it was soaked in water and then pressed and rolled as described in Example VI. Meatlike fibrous texture (visual) was developed. The product had meatlike textural mouth feel when chewed.

EXAMPLE VIII

The same as Example VII except that the prepared extrudate was pressed and rolled over a flat surface by using a kitchen roller. Meatlike fibrous product was obtained.

EXAMPLE IX

A 10% in water suspension of an extrudate, comprised of 30% Torula Yeast, (as an example, Amoco Torula Dried Yeast), 60% soy flour (as an example Central Soya's Soyafluff 200T) and 10% soy protein isolate (as an example, Ralston Purina's Supro-610) was autoclaved for 15 minutes at 250°F., 15 psi. The supernatant was then decanted and discarded. The residual extrudate was again suspended in water, autoclaved, and supernatant decanted, as before. Excess water was blotted from the residual extrudate with absorbent paper. The residual extrudate had an improved bland flavor.

EXAMPLE X

An extrudate of similar composition as in Example IX was placed in a column, for example a 1000 ml. graduated cylinder, hot water was flushed through the column, for example for approximately 15 hours at approximately 15 ml/min., water was introduced at the bottom of the graduated cylinder by means of a length of plastic or rubber tubing and allowing the water to spill over the top of the graduated cylinder. The water was decanted from the cylinder and the excess water was blotted from the residual extrudate with absorbent paper. The residual extrudate had an improved bland flavor, the yield in this type of washing was approximately 65%.

EXAMPLE XI

The same procedure as Example X except cold water (tap) was used. The residual extrudate had an improved bland flavor.

EXAMPLE XII

The same procedures were followed as in Examples IX, X and XI. The extrudate had a composition of 30% Torula Yeast (as an example, Amoco Torula Dried Yeast) 70% soy flour (as an example, Central Soya's Soyafluff 200W). The residual extrudate had an improved bland flavor.

EXAMPLE XIII

The residual extrudates of Examples IX, X, XI and XII were each pressed and flattened by the use of a rolling pin. Surprisingly the flattened extrudate had a meatlike appearance, texture and mouth feel.

EXAMPLE XIV

The same procedure as Example XIII was used except a powdered beef flavoring (as an example, Herb-Ox beef flavored bouillon) was mixed with the extrudate just prior to flattening with the rolling pin. The resulting product had a beef-like appearance, texture, mouth feel and flavor.

EXAMPLE XV

The same procedure as Example XIII was used except a powdered chicken flavoring (as an example, Herb-Ox Chicken flavored bouillon) was used in place of beef flavoring. The resulting product had a chicken-like appearance, texture, mouth feel and flavor.

EXAMPLE XVI

A 10% water suspension of an extrudate comprised of 20% Torula Yeast (as an example, Amoco Torula Dried Yeast) and 80% soyflour (as an example, Central Soya's Soyafluff 200W), was adjusted to pH4 by titrating with hydrochloric acid. The suspension was autoclaved for 5 min. at 250°F. and 15 psi. The pH was then adjusted back to pH4. (Decant the supernatant and add water to the residual extrudate to the original volume of the suspension). The pH was again adjusted to 4 with hydrochloric acid and the previous autoclaving and decant procedure was repeated. Again the residual extrudate was resuspended and the pH was adjusted to 4. The suspension was allowed to stand at ambient temperature, approximately 72°F., for 10 min., and the supernatant was decanted. Surprisingly the net material loss of extrudate was approximately 25%. The product had an improved bland flavor.

The many uses and advantages of the products produced in accordance with this invention become apparent when it is realized that such analogs can be used as extenders or replacers for meat, poultry, and fish in food products without causing any adverse sensory reaction. The nutritional quality of the product can be tailored to a particular specification. Such meat analogs can be mass produced with reasonable uniform quality. Moreover, these analogs do not leave the beany aftertaste typical of all soy protein based analogs.

We claim:

1. A process for imparting meatlike texture to mixtures of protein materials comprising the steps of:
   a. preparing a mixture of a single-cell protein material and at least one material selected from the group consisting of (1) animal protein and (2) plant protein, said mixture containing about 5 to about 50 percent of the single-cell protein component;
   b. adjusting the moisture level to about 20 to about 45 percent;
   c. extruding the moisturized protein mixture at temperatures within the range of 210° to 385°F. to provide a shaped extrudate;
   d. drying the extrudate at temperatures ranging from about 130 to about 350°F.; and
   e. cooling the dried extrudate to produce a product which has meatlike chewability and resists dispersion in water.

2. The process of claim 1 wherein the extrudate from step (c) is chopped with a rotating knife.

3. The process of claim 2 wherein the product from step (e) is (1) washed with water having a temperature between 5° to about 250°C. and pH of about 4.5 to about 9.5, (2) subjected to a mild shear force by the action of a pair of differential speed rollers and (3) dried at temperatures between 40° to about 230°C. to produce a product having meatlike appearance, sensory-textural properties of animal proteins and a bland flavor.

4. The process of claim 3 wherein the dried product from step (e)(3) is flavored with meat flavorings selected from the group consisting of beef, pork, chicken and fish flavorings.

5. The texturized product prepared by the process of claim 3.

6. The process of claim 2 wherein the product from step (e) is (1) washed with water having a temperature between 5° and about 250°C. and pH of about 4.5 to about 9.5, (2) subjected to a mild shear force by the action of a pair of differential speed rollers and (3) frozen.

7. The process of claim 1 wherein the extrudate from step (c) is pulled immediately.

8. The process of claim 1 wherein the extrudate from step (c) is exposed to a friction force by passing it through differential speed rollers.

9. The process of claim 1 wherein the extrudate from step (c) is cooled, hydrated and exposed to a friction force by passing it through differential speed rollers.

10. The process of claim 1 wherein the extrudate from step (c) is (1) washed with water having a temperature between 5° and about 250°C. and pH of about 4.5 to about 9.5 under pressure in a batch retort, (2) subjected to a mild shear force by the action of a pair of differential speed rollers and (3) dried at temperatures between 40° to about 230°C. to produce a product having meat-like appearance, sensory-textural properties of animal proteins and a bland flavor.

11. The process of claim 10 wherein the dried product from step (c) (3) is flavored with meat flavorings selected from the group consisting of beef, pork, chicken and fish flavorings.

12. The process of claim 1 wherein the extrudate from step (c) is (1) washed with water having a temperature between 5° and about 250°C. and pH of about 4.5 to about 9.5 under pressure in a continuous retort, (2) subjected to a mild shear force by the action of a pair of differential speed rollers and (3) dried at temperatures between 40° to about 230°C. to produce a product having meatlike appearance, sensory-textural properties of animal proteins and a bland flavor.

13. The process of claim 1 wherein the extrudate from step (c) is (1) washed with water having a temperature between 5° and about 250°C. and pH of about 4.5 to about 9.5 under pressure in a batch retort. (2) subjected to a mild shear force by the action of a pair of differential speed rollers and (3) canned and retorted while wet.

14. The process of claim 13 wherein the sheared extrudate from step (c) (2) is flavored with meat flavorings selected from the group consisting of beef, pork, chicken and fish flavorings.

15. The process of claim 1 wherein the extrudate from step (c) is (1) washed with water having a temperature between 5° and about 250°C. and pH of about 4.5 to about 9.5 under pressure in a continuous retort, (2) subjected to a mild shear force by the action of a pair of differential speed rollers and (3) canned and retorted while wet.

16. The texturized product prepared by the process of claim 15.

17. The process of claim 1 wherein the single-cell protein is yeast.

18. The process of claim 1 wherein the single-cell protein materials are selected from the group consisting of Candida utilis, Saccharomyces carlsbergensis. Saccharomyces cerevisiae and Saccharomyces fragilis.

19. The process of claim 1 wherein the plant protein materials are selected from the group consisting of soy flour, defatted soy flour, soy flakes, soy protein isolates and concentrates, cotton seed flour, cotton seed protein isolates and concentrates, peanut flour, peanut protein isolates and concentrates, sesame seed flour, sesame seed protein isolates and concentrates, corn flour, corn grits, corn protein isolates and concentrates, gluten, cereal protein isolates and concentrates, rapeseed flour and rapeseed protein isolates and concentrates.

20. The process of claim 1 wherein the animal protein materials are selected from the group consisting of fish protein concentrate, slaughterhouse waste meat and bone meal.

21. The process of claim 1 wherein the mixture of single-cell protein material and plant protein are selected from the formulations consisting of (1) 30% *Candida utilis* (yeast), 60% defatted non-toasted soy flour and 10% soy protein isolate, (2) 30% *Candida utilis* (yeast) and 70% defatted non-toasted soy flour, and (3) 20% *Candida utilis* (yeast) and 80% soy flour.

22. The process of claim 1 wherein the mixture of single-cell protein material, animal material and plant protein are selected from the formulations consisting of (1) 30% *Candida utilis* (yeast), 65% soy flour and 5% meat and bone meal and (2) 30% *Candida utilis* (yeast), 35% defatted soy flour, 5% meat and bone meal and 30% wheat flour.

23. The process of claim 1 wherein the temperature in step (c) is between 218° to 265°F and the temperature in step (d) is between 150° to 200°F.

24. The process of claim 1 wherein the mixture of step (a) is fortified with ingredients selected from the group consisting of amino acids, vitamins, minerals, salt, pepper and food colorings.

25. The process of claim 1 wherein the single-cell protein material is fungi or bacteria.

* * * * *